US010262429B2

(12) United States Patent
Tanaka

(10) Patent No.: US 10,262,429 B2
(45) Date of Patent: Apr. 16, 2019

(54) MARKER IMAGE PROCESSING SYSTEM

(71) Applicant: National Institute of Advanced Industrial Science and Technology, Tokyo (JP)

(72) Inventor: Hideyuki Tanaka, Nagareyama (JP)

(73) Assignee: NATIONAL INSTITUTE OF ADVANCED INDUSTRIAL SCIENCE, Tokyo (JP)

( * ) Notice: Subject to any disclaimer, the term of this patent is extended or adjusted under 35 U.S.C. 154(b) by 196 days.

(21) Appl. No.: 15/025,102

(22) PCT Filed: Sep. 8, 2014

(86) PCT No.: PCT/JP2014/073682
§ 371 (c)(1),
(2) Date: Mar. 25, 2016

(87) PCT Pub. No.: WO2015/045834
PCT Pub. Date: Apr. 2, 2015

(65) Prior Publication Data
US 2016/0239952 A1      Aug. 18, 2016

(30) Foreign Application Priority Data

Sep. 30, 2013    (JP) .................................. 2013-204947

(51) Int. Cl.
| | |
|---|---|
| *G06K 9/00* | (2006.01) |
| *G06T 7/60* | (2017.01) |
| *G01D 5/26* | (2006.01) |
| *G06T 7/70* | (2017.01) |
| *G06T 7/73* | (2017.01) |

(52) U.S. Cl.
CPC ................ *G06T 7/60* (2013.01); *G01D 5/26* (2013.01); *G06T 7/70* (2017.01); *G06T 7/74* (2017.01);

(Continued)

(58) Field of Classification Search
CPC .. G06T 7/004; G06T 7/74; G06T 7/70; G06T 7/60; G06T 2200/04; G06T 2207/30204; G06T 2207/30244; G01D 5/26
See application file for complete search history.

(56) References Cited

U.S. PATENT DOCUMENTS

| | | | |
|---|---|---|---|
| 9,495,749 B2 * | 11/2016 | Tanaka | ................ G06T 7/0044 |
| 2006/0184013 A1 * | 8/2006 | Emanuel | ................ G01S 5/16 600/426 |
| 2009/0299684 A1 | 12/2009 | Imanishi et al. | |

FOREIGN PATENT DOCUMENTS

| | | |
|---|---|---|
| JP | 2003-281504 A | 10/2003 |
| JP | 2009-288152 A | 12/2009 |

(Continued)

OTHER PUBLICATIONS

Kanbara et al., "Real-time Estimation of Light Source Environment for Photorealistic Augmented Reality", Aug. 2004, IEEE, Proceedings of the 17th Int. Conf. on Pattern Recognition, 2004, p. 1-4.*

(Continued)

*Primary Examiner* — Vincent Rudolph
*Assistant Examiner* — Timothy Choi
(74) *Attorney, Agent, or Firm* — Workman Nydegger

(57) ABSTRACT

The marker has thereon one three-dimensional indicator 3. Based on the location and height of the three-dimensional indicator 3 relative to the plane indicator 2 as well as the estimated position of the camera relative to the marker, the center positions of the upper face and the lower face of the three-dimensional indicator 3 on the image of the camera are estimated. The estimated center position of the upper face of the three-dimensional indicator 3 is compared with that detected from the image. When the error between them has a value equal to or higher than a predetermined value, based on the posture estimated, a rotational transformation is carried out.

3 Claims, 13 Drawing Sheets

(52) U.S. Cl.
CPC ............... *G06T 2200/04* (2013.01); *G06T 2207/30204* (2013.01); *G06T 2207/30244* (2013.01)

(56) References Cited

FOREIGN PATENT DOCUMENTS

| | | |
|---|---|---|
| JP | 2012-145559 A | 8/2012 |
| WO | 2014/174052 A1 | 10/2014 |

OTHER PUBLICATIONS

Vogt et al., "Single Camera Tracking of Marker Clusters: Multiparameter Cluster Optimization and Experimental Verification", Oct. 2002, IEEE, Proceedings Int. Symposium on Mixed and Augmented Reality, 2002, p. 1-10.*
"Cartesian Coordinate System", Jan. 16, 2010, Wikipedia.org, p. 1-10, <https://web.archive.org/web/20100116072655/https://en.wikipedia.org/wiki/Cartesian_coordinate_system>.*
International Search Report dated Oct. 21, 2014, issued in PCT/JP2014/073682, filed Sep. 8, 2014.
Written Opinion dated Oct. 21, 2014, issued in PCT/JP2014/073682, filed Sep. 8, 2014.
Extended European Search Report dated Jul. 3, 2017, issued in EP 14850001.0.
Office Action dated Sep. 5, 2017, issued in JP 2015/539078.
Hideyuki et al., *AR Markers Enabling Accurate Pose Estimation Even in Frontal Observation*, USJ SJC Technical Report, vol. 2012, CG 117, No. 3, Jun. 22, 2012, pp. 2-6.

* cited by examiner

MARKER IMAGE PROCESSING SYSTEM

TECHNICAL FIELD

The present invention relates to a marker image processing system to extract various pieces of information by subjecting a marker to an image processing.

BACKGROUND ART

Such a marker is used in the field of AR (Augmented Reality), the measurement field of a local portion, and the robotics field in order to allow a camera to recognize the position or posture of an object. Generally, a flat plate-type marker including a plane pattern that can be adhered to an object as a target has been widely used.

For example, in order to realize the practical use of service robots in the future, a marker is an indispensable element to structure a system to support a secure autonomous operation by a service robot. A typical marker includes a black square frame as well as a two-dimensional pattern and a code printed therein. The marker is recognized by a camera so that the relative position and posture to the marker can be recognized and the position and posture of the object attached with the marker can be recognized. Information recorded in the marker also can be read by the camera.

FIG. 1 illustrates examples of generally-used ARToolKit marker, ARTag marker, CyberCode marker, and ARToolKitPlus marker. In addition to such markers, a marker that can record a greater amount of information such as a QR Code also can be used.

For example, in the AR field, a CG (Computer Graphics) model is displayed while being superposed on a real world image so that the position of the model is adjusted with the position of the AR marker attached to the object in the real world image.

In the robotics field, a marker attached to an object for example has been measured by a robot to thereby allow the robot to recognize the position and posture of the object attached with the marker so that the object can be operated.

FIG. 2 illustrates an example of a robot task using a marker in the robotics field. In order to provide livelihood support for a person sitting on a wheelchair, a camera attached to a robot hand of a robot arm tip end, wherein the robot arm is attached to the wheelchair, is allowed to recognize a refrigerator knob attached with a marker to thereby allow the robot hand to automatically open and close the refrigerator door. In the task shown in FIG. 2, after the marker is recognized by the camera, the robot can autonomously generate a predetermined robot arm orbit based on the marker position and the posture thereto as a reference to thereby open the refrigerator door.

The measurement of the marker by the camera has been carried out in the manner as described below for example. First, when the camera is a flat plate-type marker including a square outer frame for example, an outer frame is extracted by subjecting read image data to an image processing and four corners are detected. Then, based on a geometric calculation using the positional relation between the positions of four corners (the respective vertexes of the square) in this marker known in advance and four corners in an image read by the camera, the position and posture of the camera relative to the marker can be analyzed to recognize the position and posture of the object attached with the marker.

However, at a position in the vicinity of where the marker faces the camera, the marker undesirably has an increased measurement error. Furthermore, even when the camera can reduce the dispersion of marker measurement values by using a filter (e.g., an average filter, a Kalman filter, or a particle filter) or a measurement history, it has been difficult to securely determine whether or not the marker measurement values are a true value.

In order to prevent the deterioration of the measurement accuracy of the position or posture of the camera using such a flat plate-type marker, Patent Publication 1 discloses that a pattern constituting a marker has thereon a lens whose grayscale pattern is changed depending on the observation direction and the grayscale pattern is changed to thereby accurately measure the position or posture of the camera relative to the marker to accurately recognize the position or posture of the object attached with the marker.

CITATION LIST

Patent Literature

PTL 1: Japanese Patent Laid-Open No. 2012-145559

SUMMARY OF INVENTION

Technical Problem

In the case of the conventional flat plate-marker however, a risk is disadvantageously caused in which the posture of the camera relative to the marker may cause a measurement error, which causes the recognition of the position or posture of the object attached with the marker to be unstable depending, for example, on the size of the marker, the distance between the camera and the marker, and the angle of view of the camera (focal length).

FIG. 3 shows, at the left side thereof, a case where the camera and the marker are provided in the vicinity to each other or a case where the camera has a wide angle of view (wide lens). FIG. 3 shows, at the center thereof, a case where the camera is separated from the marker or a case where the camera has a narrow angle of view (telephoto lens). When the camera is separated from the marker or when the camera has a narrow angle of view (telephoto lens) and when the outer frame of the marker is projected onto the imaging area having the lens center axis as a normal line, as shown in the right side of FIG. 3, even when an angle formed a straight line passing through the lens center point and the marker center point (Visual line) and the marker plane is inclined in an opposite direction, the marker outer frame in the imaging area has a reduced deviation. This consequently makes it difficult to discriminate the former from the latter to cause the discrimination therebetween to be unstable. Therefore, in the robotics field for example, the posture of the camera relative to the marker is falsely estimated, which causes an erroneous operation of the robot hand.

FIG. 4 illustrates an image that is actually imaged when an angle formed by the Visual line passing through the lens center point and the marker center point and the normal line at the marker center point is 45 degrees C. The term (Camera1) represents an image imaged by a lens having an angle of view of 7.1 degrees C. The term (Camera2) represents an image imaged by a lens having an angle of view of 40.0 degrees C. It can be confirmed that, when the (Camera1) image is compared with the (Camera2) image, the (Camera1) image causes a little difference than in the case of applying orthographic projection conversion to the marker.

FIG. 5 illustrates, by arrows, the vectors of the normal lines (Z axes) passing through the center points of flat plate-type markers obtained by continuously analyzing the posture of the marker held by a hand by an image processing. It can be seen that, depending on the movement of the hand, the reference numerals 02, 06, and 08 show that the normal line vector has an opposite direction at which stage the estimation of the camera posture relative to the AR marker is fluttered.

In order to prevent the false estimation as described above, it may be considered that a flat plate-type marker includes six indicators including three-dimensional indicators having different heights from one another and the respective indicators in addition to the outer frame are identified so that, based on data regarding the positions and heights of the respective three-dimensional indicators relative to the flat plate-type marker, the rotation angles around the X axis, the Y axis (a two-dimensional coordinate on the marker plane), the Z axis, and each axis can be analyzed. In the case of the method as described above however, in order to determine the position or posture of the camera relative to the marker, the six indicators must be accurately identified by an image processing. However, an indicator placed at the shadow of the three-dimensional indicator cannot be identified. Thus, if the camera moves out of a limited scope within which all of the six points can be accurately imaged, the accurate identification of the position and posture is undesirably impossible. In addition, the positions or heights of the respective three-dimensional indicators must be selected very accurately, which causes a disadvantage of a significant increase of the marker cost.

In view of the above, the present invention has the following objective. Specifically, only one three-dimensional indicator added to a flat plate-type marker is used and this three-dimensional indicator is used only to determine whether or not an estimated posture is appropriate. When the posture is estimated falsely, then the data of the camera posture relative to an already-calculated marker can be easily modified by merely converting the data based on a fixed rule.

Solution to Problem

In order to solve the above disadvantage, the present invention provides an image processing system in which a marker having a plane indicator is used to recognize the position and posture of a camera relative to the marker, comprising: a first estimation means that allows the marker to have one three-dimensional indicator having a predetermined height located at a position predetermined relative to the plane indicator and that compares the location of the plane indicator extracted by the image of the camera with the predetermined location of the plane indicator to thereby estimate the position and posture of the camera relative to the marker; a second estimation means that estimates, based on the location and height of the three-dimensional indicator as well as the position of the camera relative to the marker estimated by the first estimation means, the center positions of an upper face and a lower face of the three-dimensional indicator on the image of the camera; a detection means that detects, based on the image of the camera, the center position of the upper face of the three-dimensional indicator; a determination means that compares the center position of the upper face of the three-dimensional indicator estimated by the second estimation means with the center position of the upper face of the three-dimensional indicator detected by the detection means based on each of vectors from the center position of the lower face of the three-dimensional indicator estimated by the second estimation means as an origin to each of the center positions of the upper face of the three-dimensional indicator to determine, when the error has a value equal to or higher than a predetermined value, that the posture of the camera relative to the marker estimated by the first estimation means is false; and a calculation means by which, when the false determination is made by the determination means, signs of a visual-line angle around an X axis and a visual-line angle around a Y axis of the camera based on the posture estimated by the first estimation means are inverted respectively so that the posture of the camera relative to the marker estimated by the first estimation means is correct and are subjected to a rotational transformation to thereby recalculate the posture of the camera relative to the marker. The X axis and the Y axis respectively represent coordinate axes orthogonal to each other on the marker plane at a three-dimensional coordinate having one point on the marker plane as an origin.

Advantageous Effects of Invention

According to the present invention, by merely locating one three-dimensional indicator having a predetermined height at a predetermined position of a marker having a plane indicator, whether an estimated posture is appropriate or not can be determined. When a false estimation is determined, then the data of the posture of the camera relative to an already-calculated marker can be easily modified by converting the data based on a fixed rule. Thus, accurate and secure posture estimation can be achieved with a low cost without being disturbed by other three-dimensional indicators.

DESCRIPTION OF EMBODIMENTS

The following section will describe an embodiment of the present invention using the drawings.

Embodiment

Figure 1:
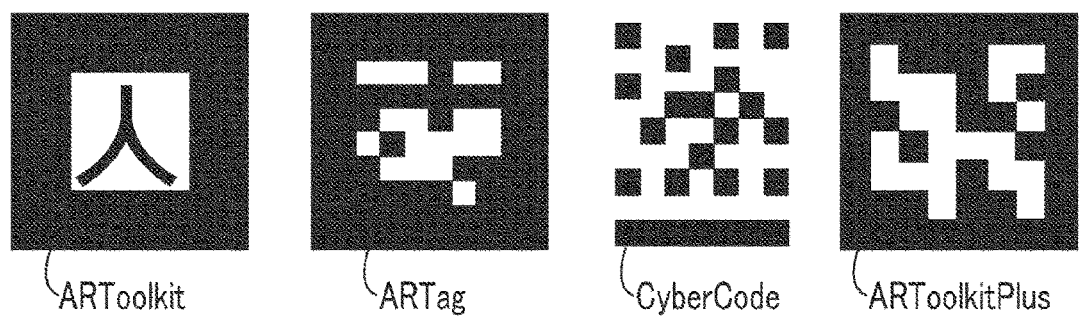
FIG. 1 illustrates an example of a general marker.
Figure 2:
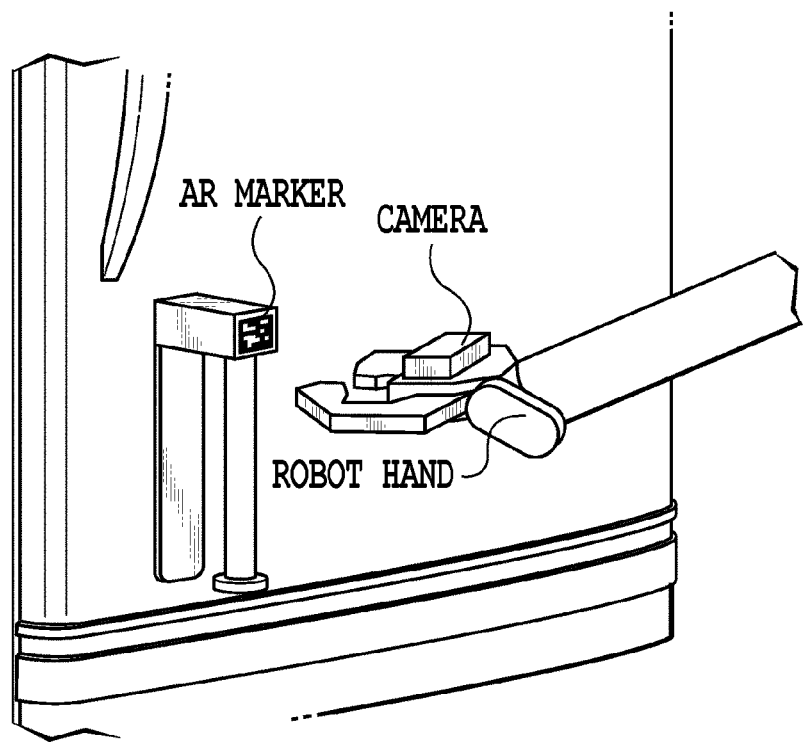
FIG. 2 illustrates an example of a robot task using a marker.
Figure 3:
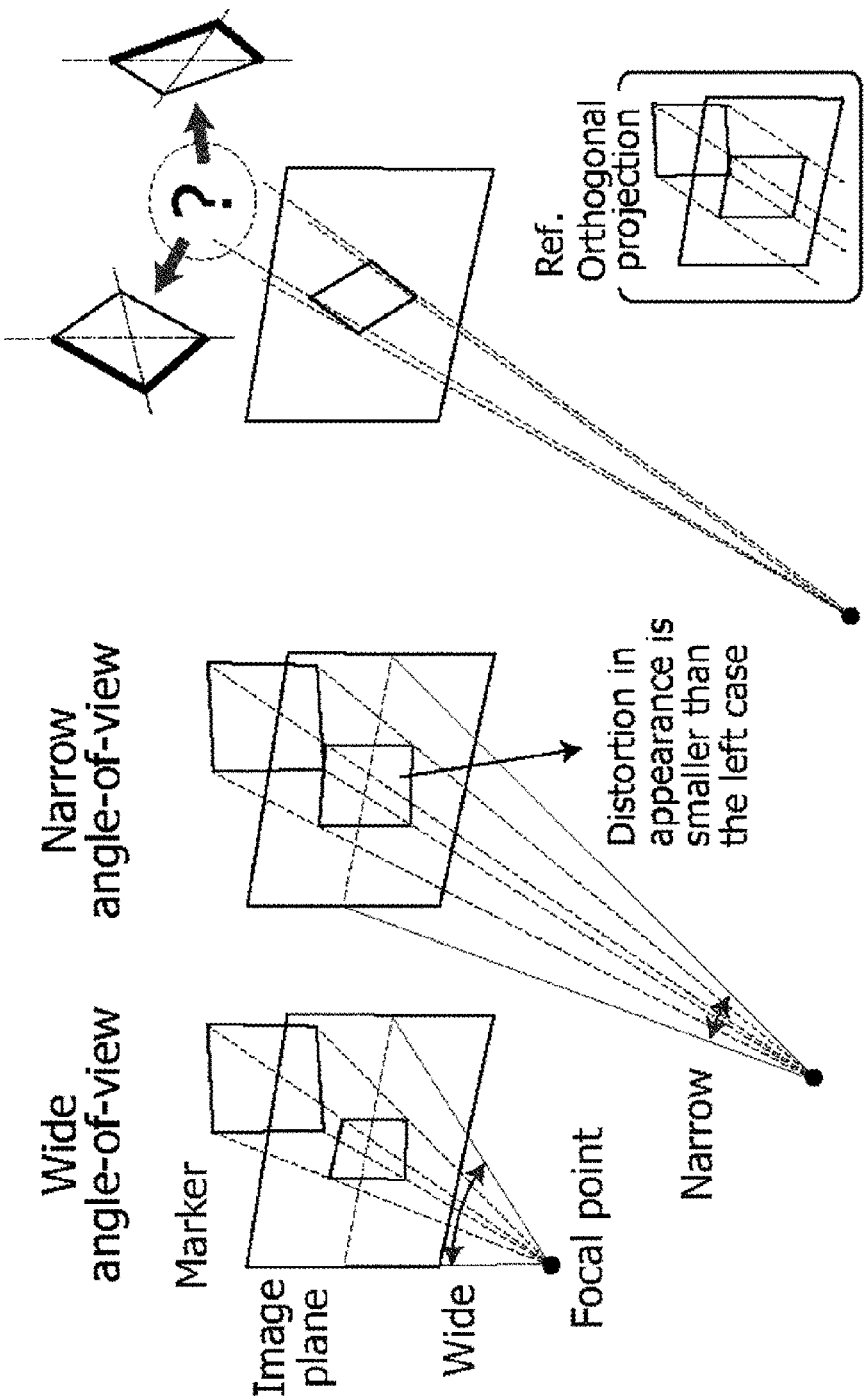
FIG. 3 illustrates the comparison between a case where a camera is in the vicinity of a marker or the camera has a wide angle of view (left side), a case where the camera is separated from the marker or the camera has a narrow angle of view (center) and shows a case where a false estimation occurs (right side)
Figure 4:
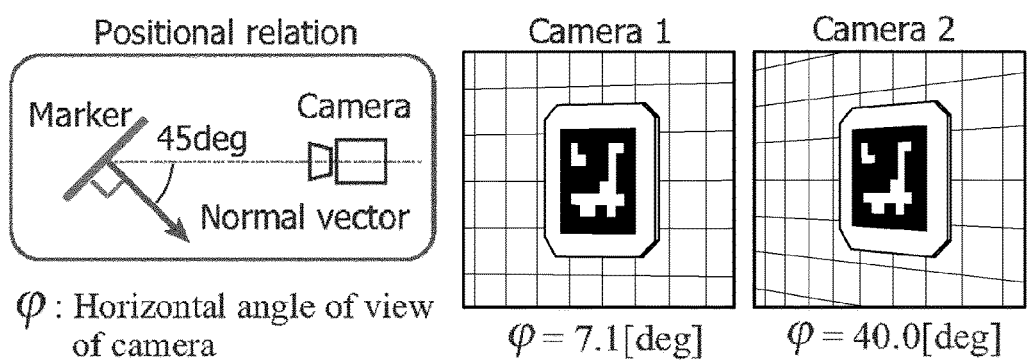
FIG. 4 illustrates the comparison between a case where an image obtained when the angle of view is narrow (Camera1) and a case where an image obtained when the angle of view is wide (Camera2)
Figure 5:
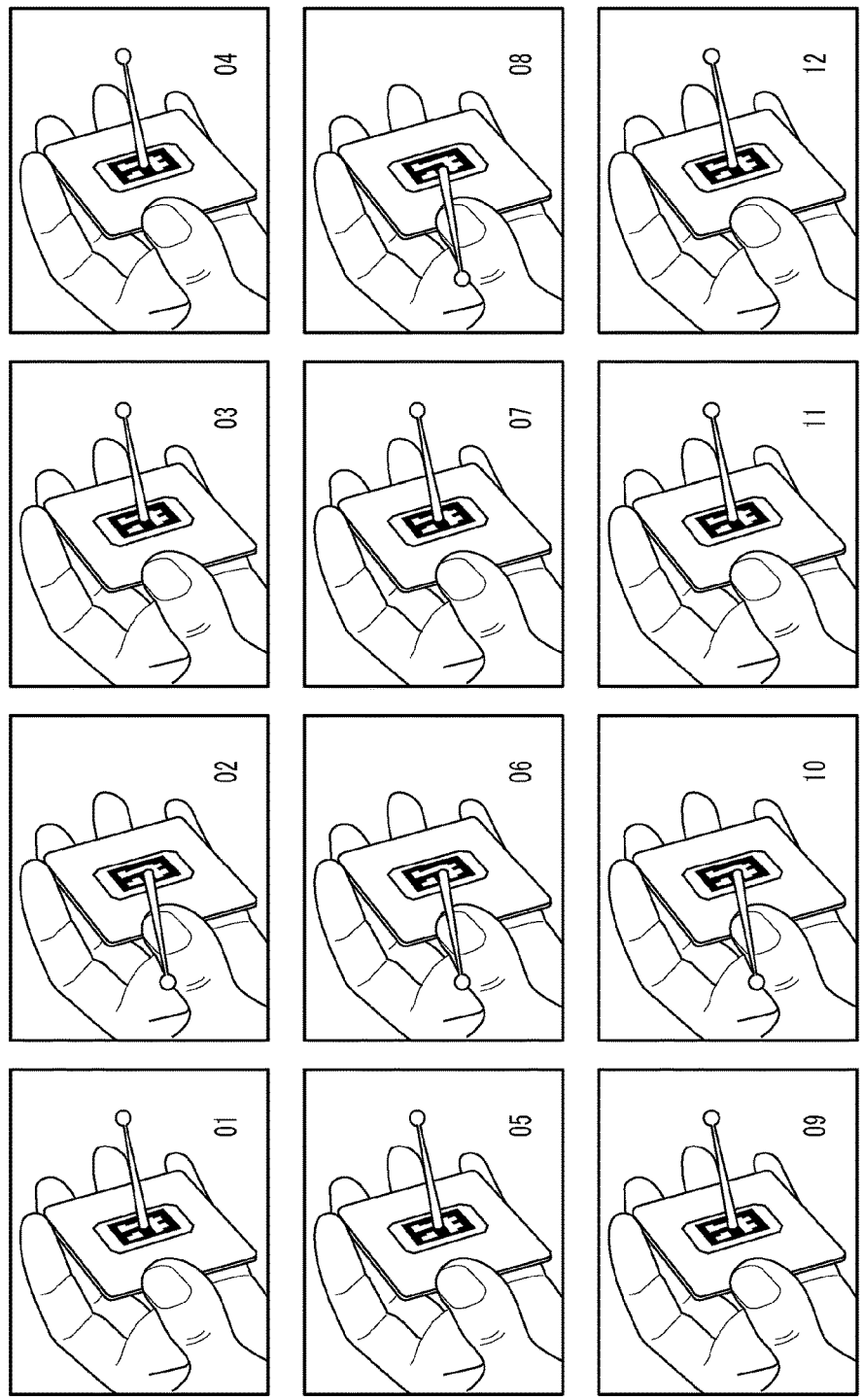
FIG. 5 illustrates the direction of the normal line (Z axis) passing through the center point of a marker obtained by continuously analyzing the posture of the marker held by a hand.
Figure 6:
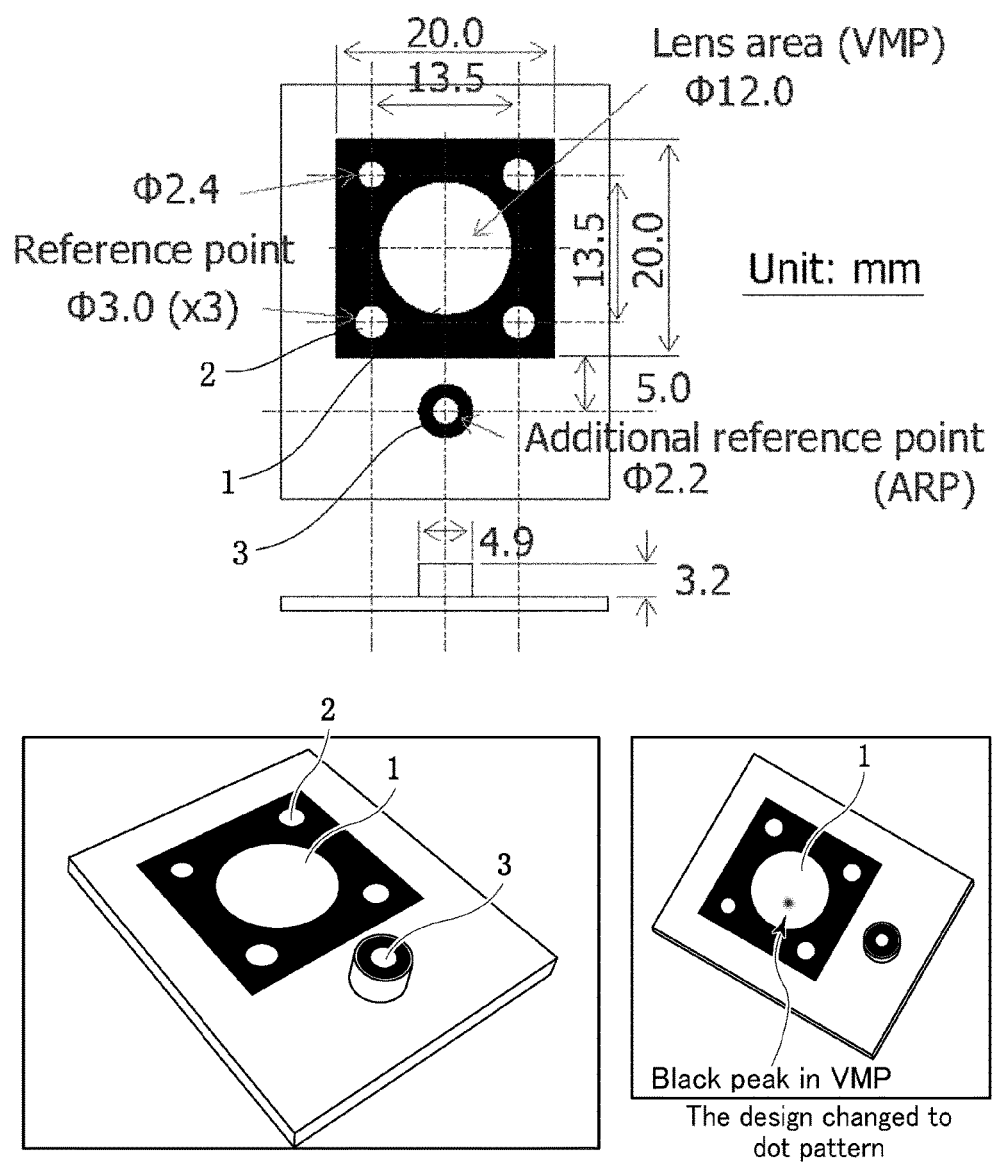
FIG. 6 illustrates an example of the marker used in an embodiment.

First, a marker used in this embodiment will be described. As shown in FIG. 6, a flat plate-type marker is configured so that a square having an outer frame of 20 mm includes therein, at the center thereof, a white circle 1 having a diameter of 12 mm and white circles 2 having a diameter of 3 mm provided at the same positions on the diagonal lines from the respective vertexes of the outer frame and the remaining part is configured by a black square. In this embodiment, at a position separated by 5 mm from the bottom side of the outer frame of this flat plate-type marker, a three-dimensional indicator 3 is adhered that is composed of a cylindrical body having an outer diameter of 4.9 mm and a height of 3.2 mm. This three-dimensional indicator 3 has, on the upper face thereof, a white circle part having a diameter of 2.2 mm at the center to thereby form a marker having a black-colored outer circumference.

First, by a method similar to the conventional one, the white circles 2 provided at the four corners of marker are extracted from the image data as plane indicators are subjected to an analysis processing to thereby compare the resultant data with the previously-known positions of the white circles 2 in the marker (in this example, the respective vertexes of a square whose each side has a length 13.5 mm formed by the centers of the white circles provided at the four corners). Then, the first estimation means in the image processing system is used to estimate, based on a geometric analysis, the position (3 degree of freedom) and the posture (3 degree of freedom) of the camera. Another configuration may be used in which, by subjecting the square outer frame to an image processing without providing the white circles 2 provided at the four corners of the marker, the four vertexes are calculated as a plane indicator and are compared with a square for which each side has a length of 20.0 mm to thereby estimate the position of the camera relative to the marker.

Figure 7:
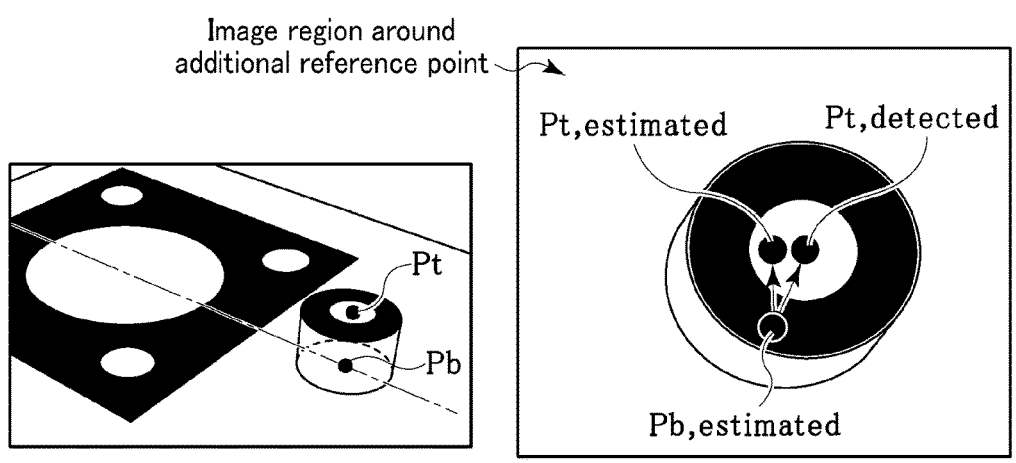
FIG. 7 shows the relation regarding the estimated position and the detected position between the center part of a three-dimensional indicator bottom face and a white marker formed in the center part of the upper face.

However, this includes a case where the posture is falsely estimated as described above. To prevent this, as shown in FIG. 7, the second estimation means in the image processing system is used to estimate, based on the plane indicator estimated by the first estimation means as a reference, the coordinates on the image plane of the position Pt, estimated of the white marker formed at the center of the upper face of the three-dimensional indicator 3 and the position Pb, estimated of the center of the bottom face of the three-dimensional indicator. On the other hand, the detection means in the image processing system is used to identify, based on the image data, the position of the center of the white marker of the center of the upper face of the three-dimensional indicator 3 to detect the position Pt,detected. When the posture is correctly estimated, Pt,estimated and Pt,detected have therebetween a small error. When the posture is falsely estimated on the other hand, Pt,estimated and Pt,detected have therebetween a large error value.

Figure 8:
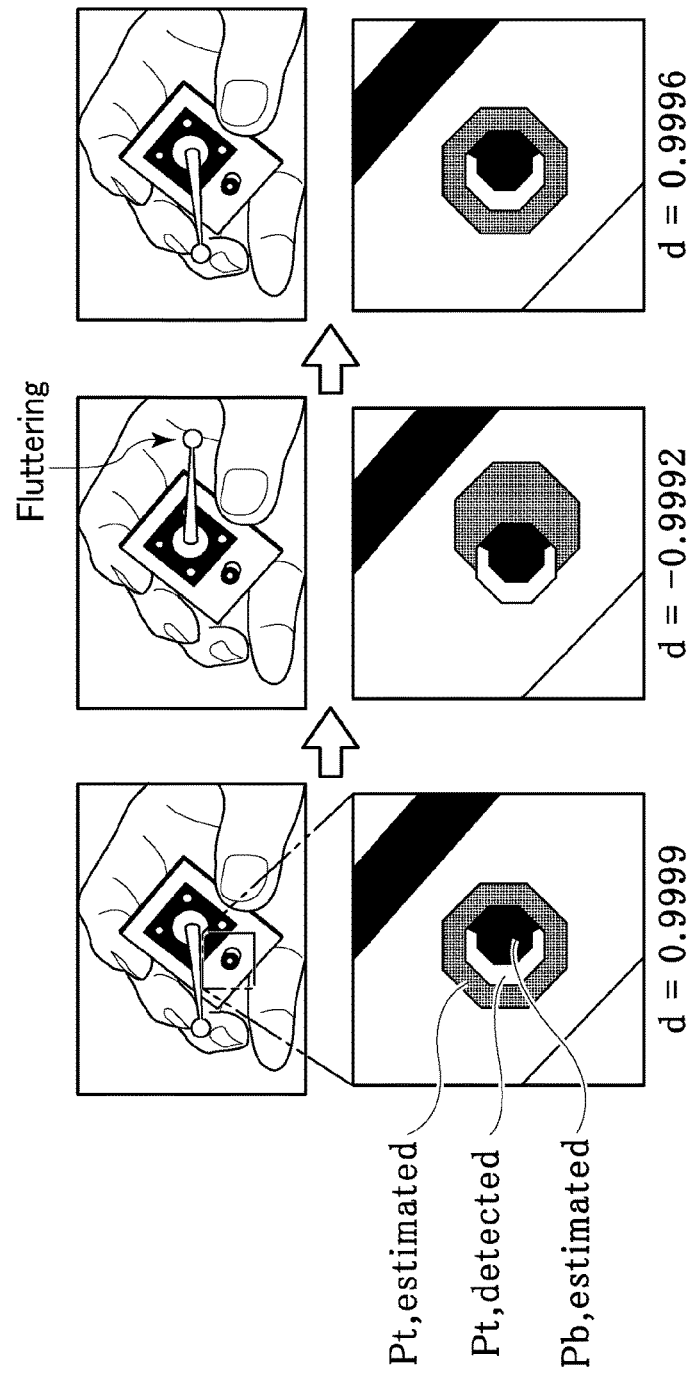
FIG. 8 shows the comparison between, when the camera is fixed and the angle of the marker held by a hand is changed, a case where the estimation is correctly carried out and a case where the estimation is falsely carried out.

In order to cope with this, when assuming that vector Vd is a vector having Pb,estimated as a starting point and Pt,detected as an end point, vector Ve is a vector having Pb,estimated as a starting point and Pt,estimated as an end point, and θ represents an angle formed by vector Vd and vector Ve, the inner product Vd·Ve of both of the vectors can be divided by |Vd||Vd| to thereby calculate the value d as a value of cos θ. FIG. 8 shows the values d, respectively, when the camera is fixed and the angle of the marker held by a hand is changed. The left side shows that the determination is correctly made and d=0.9999 is obtained, i.e., θ is substantially zero and vector Vd and vector Ve have substantially the same direction. The center side on the other side shows that d=−0.9992 is obtained, i.e., θ is substantially 180 degrees C., i.e., vector Vd and vector Ve are substantially in opposite directions.

Figure 9:
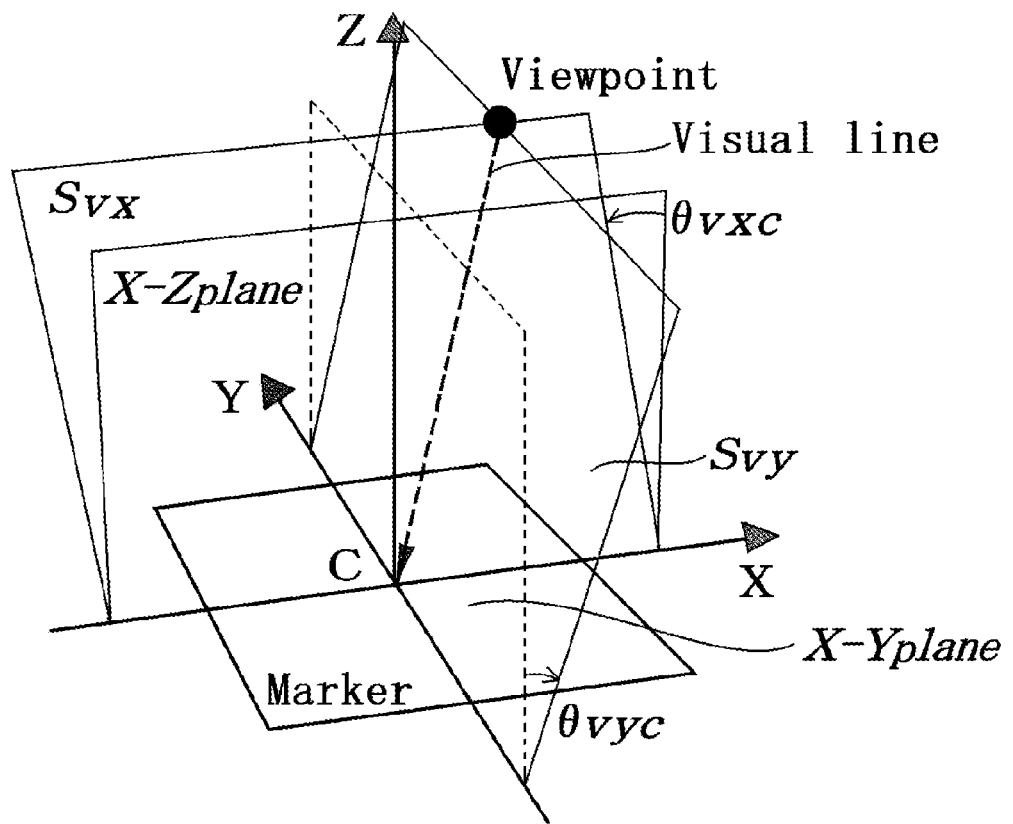
FIG. 9 illustrates a three-dimensional coordinate having the center point c of the marker as an origin.

As described above, when the positional relation of the marker in the image read by the camera is used to perform a geometric analysis, as shown in FIG. 9, at the three-dimensional coordinates having the center point C of the marker as an origin (X coordinate, Y coordinate, and Z coordinate), the normal line (Visual line) passing through the lens center point (Viewpoint) is superposed on the marker center point C. While this condition is being maintained, the angle formed by the plane $S_{VX}$ and X-Z plane defined by this normal line (hereinafter referred to as Visual line) and the X axis is defined by the visual-line angle $\theta_{VXC}$ around an X axis. Similarly, the angle formed by the plane $S_{VY}$ and the Y-Z plane defined by Visual line and the Y axis is defied by the visual-line angle $\theta_{VYC}$ around the Y axis. The three-dimensional vector of the Visual line is identified by the intersection line formed by the plane $S_{VX}$ and the plane $S_{VY}$ and this functions as a parameter showing the posture of the camera relative to the marker. The origin of the three-dimensional coordinate is not limited to the marker center point c and may be defined as one point on the marker plane.

Figure 10:
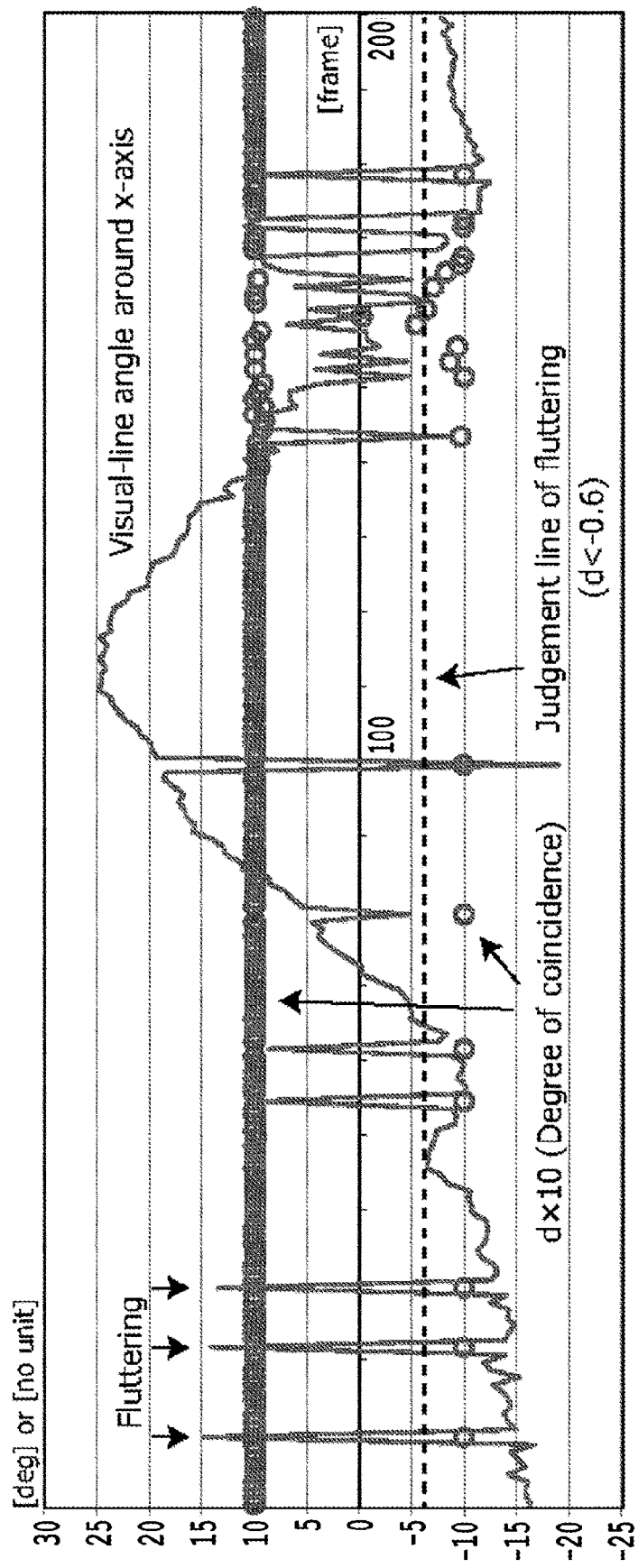
FIG. 10 illustrates a change of the visual-line angle $\theta_{VXC}$ when the marker angle is slowly changed in a continuous manner.

FIG. 10 shows, when the marker angle is slowly changed in a continuously manner, the change of the visual-line angle $\theta_{VXC}$ calculated based on the estimated posture (solid broken line) and the change of the value d(×10) (shown by ○). As can be seen from this drawing, false determination occurs at points where the line is rapidly inverted. These points show that the values d are substantially equal to or lower than −0.6. Thus, when the value d(×10) is lower than −6, i.e., when d<−0.6 is established, it can be determined that the posture is falsely estimated by the first estimation means.

Figure 11:
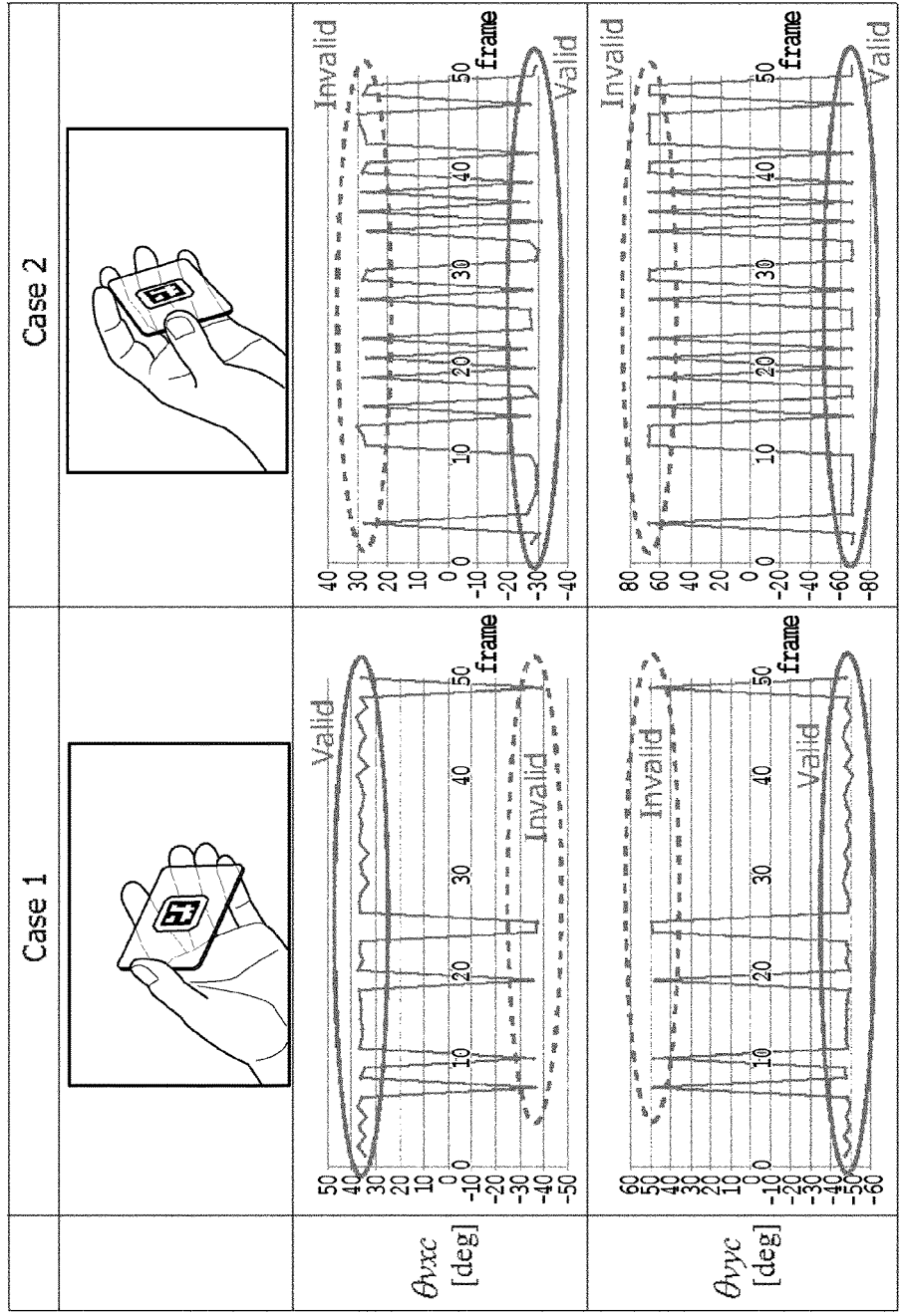
FIG. 11 illustrates the result of calculating the visual-line angle $\theta_{VXC}$ around the X axis and the visual-line angle $\theta_{VYC}$ around the Y axis based on the postures estimated based on two angles of the marker held by a hand while the camera is being fixed, respectively.

FIG. 11 illustrates the result of calculating the visual-line angle $\theta_{VXC}$ around the X axis and the visual-line angle $\theta_{VYC}$ around the Y axis based on the postures estimated based on two angles of the marker held by a hand while the camera is being fixed, respectively. The respective angles both show that the minute fluttering of the hand causes the false determination of the posture, which causes a rapid change of $\theta_{VXC}$ and $\theta_{VYC}$. As can be seen, the appropriate posture estimation value and the false posture estimation value are basically different in that the visual-line angle $\theta_{VXC}$ around the X axis and the visual-line angle $\theta_{VYC}$ around the Y axis have opposite signs.

Figure 12:
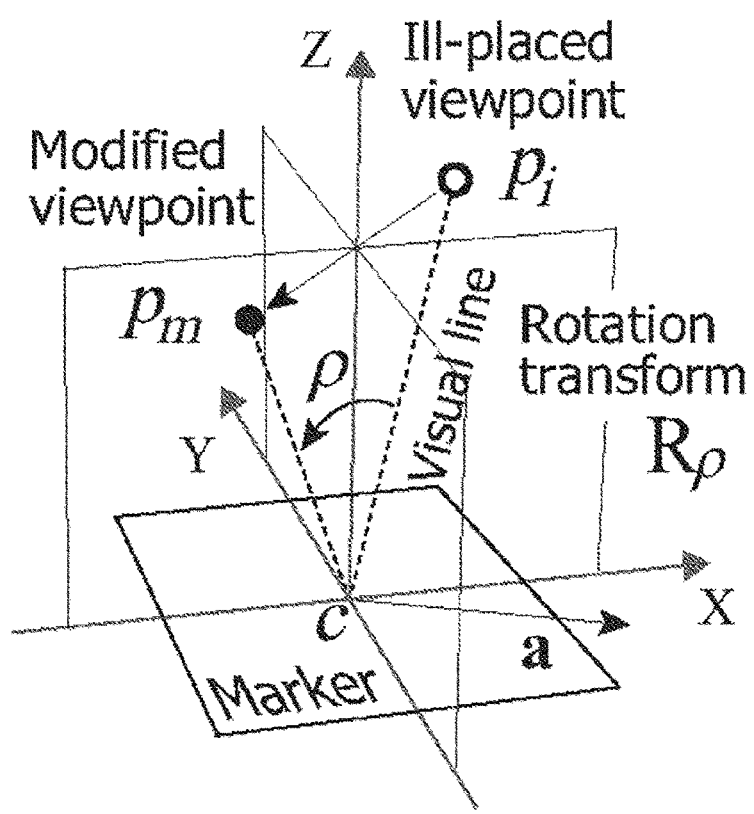
FIG. 12 illustrates the modification of the posture estimation value subjected to a rotational transformation.

Thus, when a falsely-estimated posture is determined, then the falsely-estimated posture can be modified, as shown in FIG. 12, by using a rotational transformation to set the viewpoint $P_m$ at a position at which $\theta_{VXC}$ and $\theta_{VYC}$ is inverted and the ill-placed viewpoint $P_i$ calculated based on the falsely-estimated value is returned to $P_m$ for example.

It is assumed that the viewpoint to the falsely-determined marker is $P_i$, and a modified viewpoint is $P_m$. When assuming that a vector connecting the marker center point C to $P_i$ is $CP_i$, a vector connecting the marker center point C to $P_m$ is $CP_m$, and an angle formed by these vectors is $\rho$, then a cross product of the vector $CP_1$ and the vector $CP_m$ can be used to calculate the rotation axis vector a ($a_x$ $a_y$ $a_z$) in a vertical direction to these vectors.
Specifically, $$\vec{a} = \vec{cp_i} \times \vec{cp_m} \quad \text{[Formula 1]}$$

The rotational transformation matrix $R_\rho$ can be calculated in the following manner.

$$R_\rho = \begin{pmatrix} a_x^2 C + c & a_x a_y C + a_z s & a_x a_z C - a_y s \\ a_x a_y C - a_z s & a_y^2 C + c & a_y a_z C + a_x s \\ a_x a_z C + a_y s & a_y a_z C - a_x s & a_z^2 C + c \end{pmatrix} \quad \text{[Formula 2]}$$

In the formula, $c = \cos \rho$, $s = \sin \rho$, and $C = (1 - \cos \rho)$ are established The transform matrix M and the rotational transformation matrix $R_\rho$ have therebetween a geometric relation $M = R_\rho^{-1}$. Thus, when assuming that the posture to the marker prior to modification is $R_{ini}$ and the posture to the marker after modification is $R_{mod}$, then the calculation means in the image processing system can be used to calculate $R_{mod}$ showing a modified posture based on $R_{mod} = R_{ini} \cdot M$.

Figure 13:
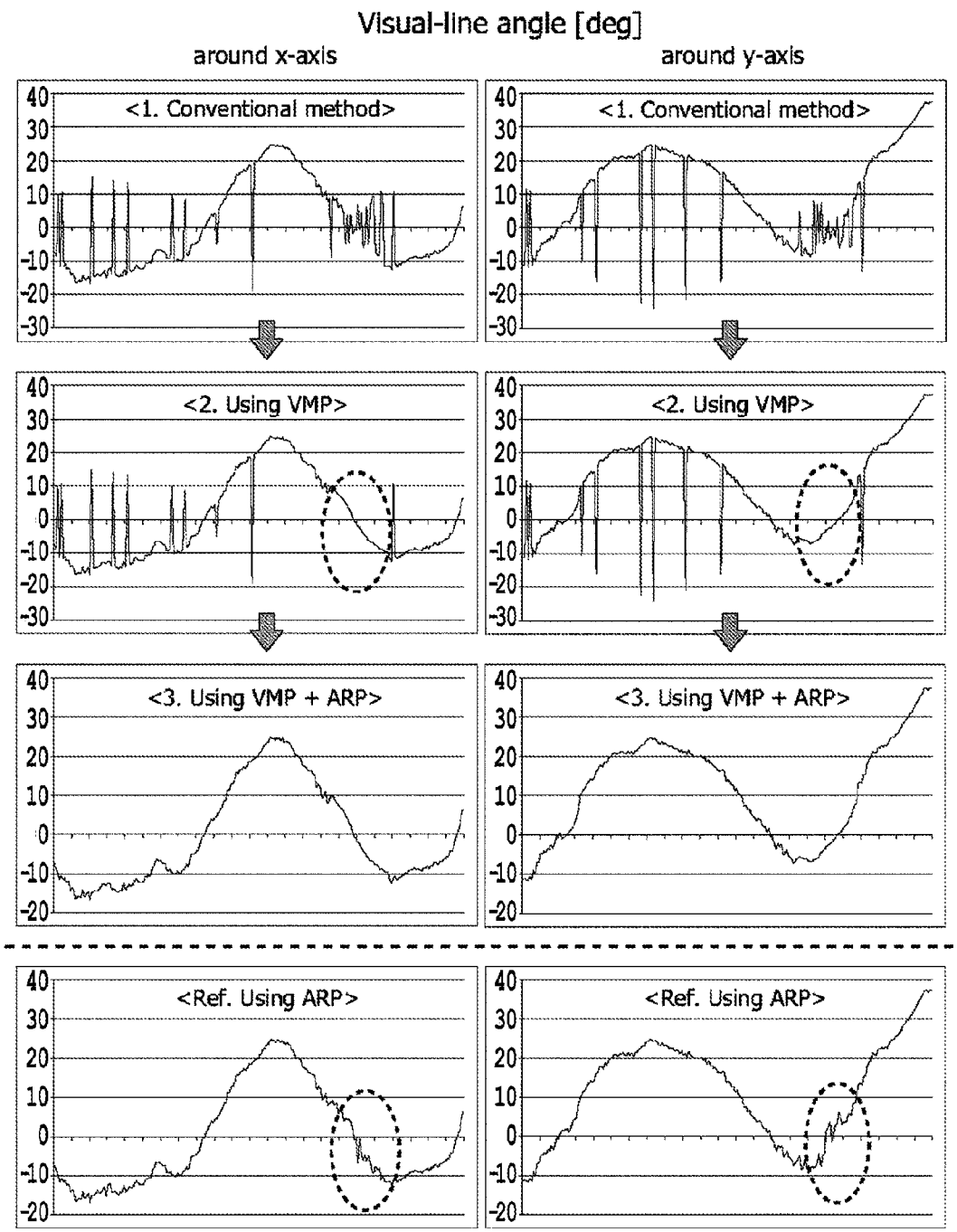
FIG. 13 illustrating the experiment result showing the effect of this embodiment.

The effect by this embodiment will be examined based on FIG. 13. FIG. 13 shows, at the left side thereof, the measurement result around the X axis ($\theta_{VXC}$) and the right side shows the measurement result around the Y axis ($\theta_{VYC}$). FIG. 13 shows, in an order from the upper side, a conventional analysis result, the analysis result (VMP) when a lens causing a change of the grayscale pattern is used, the analysis result when the lens causing a change of the grayscale pattern is combined with this embodiment, and the analysis result using this embodiment only. As can be seen, in the case of the using the lens causing a change of the grayscale pattern (VMP), it ran be confirmed that the false determination may be reduced when the visual-line angle is small, but the false determination may not be reduced when the visual-line angle is large, and the false determination may be reduced by combination of the embodiments even when the visual-line angle is large.

Next, the following section will describe a marker added with a three-dimensional indicator used in this embodiment. In this embodiment, an existing square marker having an outer frame of 20 mm is used to adhere, at a position separated by 5 mm from the center of the bottom side of the outer frame, a three-dimensional indicator composed of a cylindrical body having an outer diameter of 4.9 mm and a height of 3.2 mm by adhesive agent for example. However, various forms also can be used in which the three-dimensional indicator is integrated with the base of a flat plate-type marker for example. However, the location and height of the three-dimensional indicator relative to the plane indicator as described above must be utilized as existing data by the image processing apparatus during the above transform. Thus, these parameters must be stored in a data file in advance in the image processing apparatus. Of course, a QR Code for example may be included in the flat plate-type marker itself so that each data regarding the three-dimensional indicator can be read at the image processing apparatus side. Another configuration may be used in which the specification of the three-dimensional indicator adhered to each flat plate-type marker such as a location and a height is determined in advance and is recorded as an initial value at the image processing side.

INDUSTRIAL APPLICABILITY

As described above, according to the present invention, by merely locating one three-dimensional indicator having a predetermined height at a predetermined position of a marker having a plane indicator, whether an estimated posture is appropriate or not can be determined. When the posture is estimated falsely, then the posture can be easily modified by converting the data for the posture of the camera relative to the already-calculated marker based on a fixed rule. Therefore, the invention can be expected to be widely applied as an image processing system that can provide accurate and secure posture estimation with a low cost and without disturbing other three-dimensional indicators.

REFERENCE SIGNS LIST

1 White circle at the center of the marker
2 White circles located at the same positions on the diagonal lines from the respective vertexes of the outer frame
3 Three-dimensional indicator

The invention claimed is:
1. An image processing system in which a marker having a plane indicator is used to recognize a position and a posture of a camera relative to the marker, one three-dimensional indicator that has a predetermined height being located at a position predetermined relative to the plane indicator on the marker, wherein the image processing system is configured to:
compare a location of the plane indicator extracted from an image captured by the camera with a predetermined location of the plane indicator to estimate the position and the posture of the camera relative to the marker;
estimate, based on the location and height of the three-dimensional indicator as well as the estimated position of the camera relative to the marker, center positions of an upper face and a lower face of the three-dimensional indicator on the image captured by the camera;
detect, based on the image captured by the camera, the center position of the upper face of the three-dimensional indicator;
compare the estimated center position of the upper face of the three-dimensional indicator with the detected center position of the upper face of the three-dimensional indicator based on each of vectors from the center position of the lower face of the three-dimensional indicator as an origin to each of the center positions of the upper face of the three-dimensional indicator to determine an error, when the error has a value equal to or higher than a predetermined value, then the posture of the camera relative to the marker is false; and
when the false determination is made, respectively invert signs of a visual-line angle around an X axis and a visual-line angle around a Y axis of the camera based on the estimated posture so that the estimated posture of the camera relative to the marker is correct, wherein the visual-line angle around the X axis and the visual-line angle around the Y axis are subjected to a rotational transformation to thereby recalculate the posture of the camera relative to the marker, wherein:

the X axis and the Y axis respectively represent coordinate axes orthogonal to each other on the marker plane at a three-dimensional coordinate having one point on the marker plane as an origin.

2. A marker that allows a position and a posture of a camera to be determined by the image processing system according to claim 1, wherein:

the three-dimensional indicator having the predetermined height is located at the predetermined position of the marker having the plane indicator.

3. The marker according to claim 2, wherein:

the location and height of the three-dimensional indicator in the marker are recorded as data in the marker.

\* \* \* \* \*